(12) United States Patent
Jeong et al.

(10) Patent No.: US 12,743,877 B2
(45) Date of Patent: Sep. 22, 2026

(54) TRAINING DATASET AUGMENTATION METHOD AND SYSTEM FOR TRAINING DEEP LEARNING NETWORK

(71) Applicant: Korea Electronics Technology Institute, Seongnam-si (KR)

(72) Inventors: Jin Woo Jeong, Seoul (KR); Sung Jei Kim, Seoul (KR); Je Woo Kim, Seongnam-si (KR); Seung Ho Lee, Seoul (KR); Hyeok Min Choi, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 267 days.

(21) Appl. No.: 18/398,551

(22) Filed: Dec. 28, 2023

(65) Prior Publication Data

US 2025/0209803 A1 Jun. 26, 2025

(30) Foreign Application Priority Data

Dec. 21, 2023 (KR) ........................ 10-2023-0188544

(51) Int. Cl.
*G06V 10/72* (2022.01)
*G06V 10/774* (2022.01)
*G06V 10/82* (2022.01)

(52) U.S. Cl.
CPC .......... *G06V 10/82* (2022.01); *G06V 10/7747* (2022.01)

(58) Field of Classification Search
CPC ........................... G06V 10/82; G06V 10/7747
See application file for complete search history.

(56) References Cited

PUBLICATIONS

Albumentations, “crops” https://github.com/albumentations-team/albumentations/blob/69be4e7544b3b4de17be49420270b656f4f70684/albumentations/augmentations/crops/transforms.py, published Sep. 30, 2023 (Year: 2023).*

Augmentations from Albumentations, https://github.com/albumentations-team/albumentations/tree/69be4e7544b3b4de17be49420270b656f4f70684/albumentations/augmentations, published Sep. 30, 2023 (Year: 2023).*

Porcu, Simone, Alessandro Floris, and Luigi Atzori. “Evaluation of data augmentation techniques for facial expression recognition systems.” Electronics 9.11 (Year: 2020).*

Albumentations, “crops” https://github.com/albumentations-team/albumentations/blob/69be4e7544b3b4de17be49420270b656f4f70684/albumentations /augmentations/crops/transforms.py (Year: 2023).*

Porcu, Simone, et al., “Evaluation of Data Augmentation Techniques for Facial Expression Recognition Systems”, Electronics, Nov. 11, 2020, (12 Pages in English).

(Continued)

*Primary Examiner* — Oneal R Mistry
*Assistant Examiner* — Nhut Huy Pham
(74) *Attorney, Agent, or Firm* — NSIP Law

(57) ABSTRACT

There is provided a training dataset augmentation method and system for training a deep learning model. A training dataset augmentation method according to an embodiment configures a training dataset with image data from which a specific area is detected, and a label, and adds a new training dataset by transforming the detected area in the configured training dataset. Accordingly, by augmenting a training dataset of a deep learning model, which analyzes areas detected from an image by a detector and performs inference, through random transformation of a detection area, the deep learning model may be made to be resistant to performance degradation of the detector.

15 Claims, 5 Drawing Sheets

(56) References Cited

PUBLICATIONS

Dipet, "Commit 69be4e7: Fix mypy errors (#1486)", albumentations-team/albumentations repository, GitHub, Sep. 30, 2023, (7 Pages in English).

Korean Office Action Issued on Jan. 8, 2026, in Counterpart Korean Patent Application No. 10-2023-0188544 (5 Pages in English, 6 Pages in Korean).

* cited by examiner $X_1^N, X_2^N, Y_1^N, Y_2^N$
$X_1^N < 0$
$X_1^N = \max(X_1^N, 0)$
$X_2^N > I_W$
$X_2^N = \min(X_2^N, I_W)$
$Y_1^N < 0$
$Y_1^N = \max(Y_1^N, 0)$
$Y_2^N > I_H$
$Y_2^N = \min(Y_2^N, 0)$
Y
N
$X_1^M, X_2^M, Y_1^M, Y_2^M$
$X_1^N, X_2^N, Y_1^N, Y_2^N$
$X_2^M - X_1^M < \alpha$
$X_1^M = \frac{X_2^M + X_1^M - \alpha}{2}$
$X_2^M = \frac{X_2^M + X_1^M + \alpha}{2}$
$Y_2^M - Y_1^M < \beta$
$Y_1^M = \frac{Y_2^M + Y_1^M - \alpha}{2}$
$X_2^M = \frac{Y_2^M + Y_1^M + \alpha}{2}$
$X_1^M, X_2^M, Y_1^M, Y_2^M$
S410
S420

TRAINING DATASET AUGMENTATION METHOD AND SYSTEM FOR TRAINING DEEP LEARNING NETWORK

CROSS-REFERENCE TO RELATED APPLICATION(S) AND CLAIM OF PRIORITY

This application is based on and claims priority under 35 U.S.C. § 119 to Korean Patent Application No. 10-2023-0188544, filed on Dec. 21, 2023, in the Korean Intellectual Property Office, the disclosure of which is herein incorporated by reference in its entirety.

BACKGROUND

Field

The disclosure relates to training dataset augmentation, and more particularly, to a method for augmenting a training dataset for a deep learning model, which analyzes areas detected from an image by a detector and performs inference, to make the deep learning model resistant to degradation of performance of the detector.

Description of Related Art

1) Emotion Recognition Technology

Emotion recognition which is an essential technology in understanding people' intention is used in various fields such as human-computer interaction, medical monitoring, education, etc. Based on the development of deep learning algorithms, various technologies for extracting complex emotional clues, such as a facial expression, an acoustic behavior, a body posture, from a subject are being developed.

2) Related-Art Technology

Related-art emotion recognition technologies are divided into a traditional method and a method for artificial intelligence (AI). Related-art emotion recognition has been developed based on people's facial expressions. In addition, since emotions are influenced by surrounding circumstances, emotion recognition technologies considering surrounding circumstances have been developed. There are a method for recognizing emotions by using a people area and surrounding circumstances as an input, a method for recognizing emotions by using a human face and surrounding circumstances as an input, and a method for recognizing emotions by considering a face, a body posture, a relationship between people, and surrounding circumstances concurrently.

Emotion recognition technologies considering surrounding circumstances enhance performance by receiving various inputs such as a face, a body posture, background, rather than receiving one input, passing through a deep learning network with respect to respective inputs, fusing results of the network, and then passing through a fusion network.

3) Problems of Related-Art Technologies

In related-art technologies, training datasets for respective inputs are configured in advance in order to train a network for various inputs. For example, if a facial area and a background area in an image are required as a training dataset for input to a network, a facial area is detected from an image in advance and then a facial detection area is stored. When training is performed, a facial area is found by using stored detection data and the extracted facial area is inputted to an emotion recognizer as an input. In this case, a facial area does not need to be found every time training is performed, and training is performed with a pre-set value, so that training is efficiently performed.

When a trained network is used for real inference, a facial area should be detected through a face detector since coordinates of the facial area are not provided. However, when a face detector used for detecting a facial area for training and a face detector used for inferring are different, or performance of a face detector is degraded when inference is performed, there may be a problem that overall performance of an emotion recognizer is degraded.

SUMMARY

The disclosure has been developed in order to solve the above-described problems, and an object of the disclosure is to provide a method for augmenting a training dataset for a deep learning model, which analyzes areas detected from an image by a detector and performs inference, to make the deep learning model resistant to degradation of performance of the detector.

To achieve the above-described object, a training dataset augmentation method according to an embodiment of the disclosure may include: a step of configuring a training dataset with image data from which a specific area is detected, and a label; and a step of adding a new training dataset by transforming the detected area in the configured training dataset.

The step of configuring may include acquiring the image data from which the specific area is detected by using a detector that is trained to detect a specific area from image data.

The step of adding may include randomly transforming the detected area.

According to the disclosure, the training dataset augmentation method may further include a step of training a deep learning model which performs inference from the image data from which the specific area is detected, by using the configured training dataset and the added training dataset.

The step of adding may include: a step of extracting coordinates of the detected area from the configured training dataset; a step of generating a random number; and a step of updating the coordinates of the detected area based on the generated random number.

A generation range of the random number may be limited based on an image size and a size of the detected area.

The step of updating may include updating the coordinates for a top-left vertex of the detected area and a bottom-right vertex of the detected area based on different random numbers.

According to the disclosure, the training dataset augmentation method may further include a step of refining the updated coordinates.

The step of refining may be performed when the detected area transformed by the updated coordinates gets out of a range of the image, when leftmost coordinates are larger than rightmost coordinates, when lowermost coordinates are larger than uppermost coordinates, or when a size of the transformed detected area is less than a defined minimum size.

According to another aspect of the disclosure, there is provided a training dataset augmentation system including: a configurator configured to configure a training dataset with image data from which a specific area is detected, and a label; and a generator configured to add a new training dataset by transforming the detected area in the configured training dataset.

According to still another aspect of the disclosure, there is provided a deep learning model training method including: a step of adding a new training dataset by transforming a detected area in a training dataset which is configured with image data from which a specific area is detected, and a label; and a step of training a deep learning model which performs inference from the image data from which the specific area is detected, by using the configured training dataset and the added training dataset.

According to yet another aspect of the disclosure, there is provided a deep learning model training system including: a generator configured to add a new training dataset by transforming a detected area in a training dataset which is configured with image data from which a specific area is detected, and a label; and a trainer configured to train a deep learning model which performs inference from the image data from which the specific area is detected, by using the configured training dataset and the added training dataset.

As described above, according to embodiments of the disclosure, by augmenting a training dataset of a deep learning model, which analyzes areas detected from an image by a detector and performs inference, through random transformation of a detection area, the deep learning model may be made to be resistant to performance degradation of the detector.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in more detail with reference to the accompanying drawings.

Embodiments of the disclosure provide a method and a system for augmenting a training dataset for training a deep learning network. The disclosure relates to a data augmentation technology for making a deep learning model resistant to degradation of detection performance when training data is an image and only a specific area is detected from the image and is inputted to the deep learning model.

Specifically, rather than using the same detection area as already calculated through a data augmentation technique every time training is performed, by inputting different detection areas every time training is performed, performance degradation is prevented even if some detection areas are erroneously detected when inference is performed.

In a related-art method, training datasets for respective inputs are configured in advance in order to train a network for various inputs. For example, if a facial area and a background area in an image are required as a training dataset for input to a network, a facial area is detected from an image in advance and then a facial detection area is stored, and, when training is performed, a facial area is found by using stored detection data and the extracted facial area is inputted to an emotion recognizer as an input. A method according to an embodiment is different from the related-art training method described above.

Figure 1:
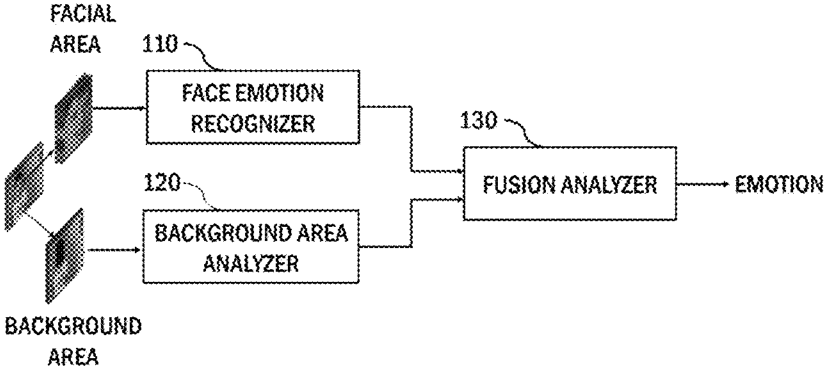
FIG. 1 is a view illustrating a background area-associated face emotion recognizer.

FIG. 1 is a view illustrating an outline of an emotion recognition system considering surrounding circumstances according to an embodiment of the disclosure. An image is divided into a facial area and a background area and then each of the divided areas is inputted to a separate network 110, 120. That is, the facial area is inputted to a face emotion recognizer 110 and the background area is inputted to a background area analyzer 120. An output from each network 110, 120 is inputted to a fusion analyzer 130 which is a synthesis network, and a final emotion recognition result is outputted.

Figure 2:
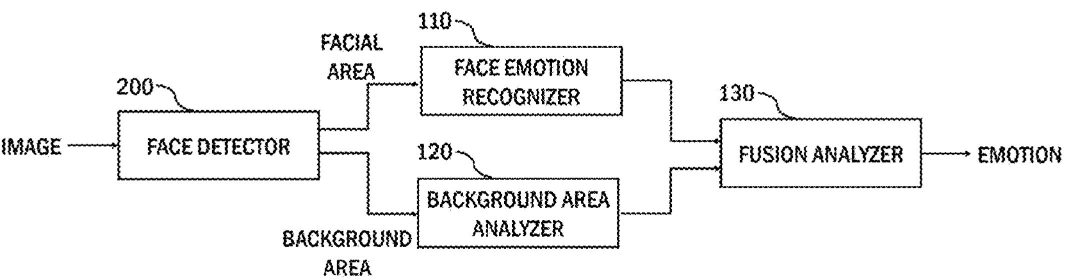
FIG. 2 is a view illustrating a background area-associated face emotion recognizer for inference.

For inference, a face detector 200 may be added as shown in FIG. 2. A face is detected through the face detector 200 and detection data goes through an emotion recognizer considering surrounding circumstances by using a facial area and a background area as an input.

Accordingly, the performance of the background area-associated face emotion recognizer 110, 120, 130 is inevitably dependent on the performance of the face detector 200. That is, when the face detector 200 does not correctly detect a facial area or a detected facial area is different from a face detection area that has been used for training, the performance of the emotion recognizer 110, 120, 130 is degraded.

Accordingly, a new facial area should be generated every time training is performed, so that an exact emotion can be recognized even if a facial area is inaccurate when inference is performed or a detected facial area is different from a face detection result of a dataset that has been used for training.

Figure 3:
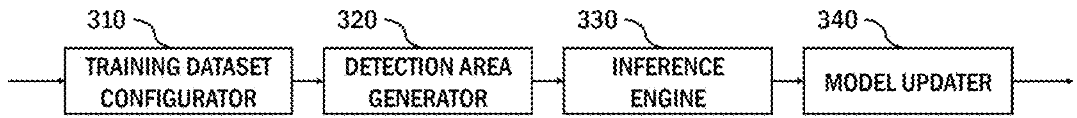
FIG. 3 is a view illustrating a detection area generator-based in training method.

FIG. 3 is a view illustrating a configuration of a training system of a background area-associated face emotion recognizer 110, 120, 130 according to an embodiment of the disclosure. As shown in FIG. 3, the training system according to an embodiment may include a training dataset configurator 310, a detection area generator 320, an inference engine 330, and a model updater 340.

The training dataset configurator 310 configures an initial training dataset. The initial training dataset is a training dataset that is configured by using image data from which a facial area is detected as an input and using emotion data as a label.

If a training dataset is configured by using an image from which a facial area is not detected as an input and using emotion data as a label, a training dataset should be configured by acquiring an image in which a face is detected from image data by using the face detector 200 of FIG. 2. There is no limit to the type and the structure of the face detector 200.

The detection area generator 320 generates a new detection area by randomly transforming a face detection area in the training dataset configured by the training dataset configurator 310, and adds a new training dataset in which only a detection area is transformed.

The inference engine 330 inputs the training dataset configured by the training dataset configurator 310, and image data of the training dataset added by the detection area generator 320 in which a face is detected to a background area-associated face emotion recognizer 110, 120, 130, and generates an inference result.

The model updater 340 updates a parameter of the emotion recognizer 110, 120, 130 by performing backpropagation by calculating a loss in the inference result of the background area-associated face emotion recognizer 110, 120, 130 by the inference engine 330, and a label of the training dataset.

Figure 4:
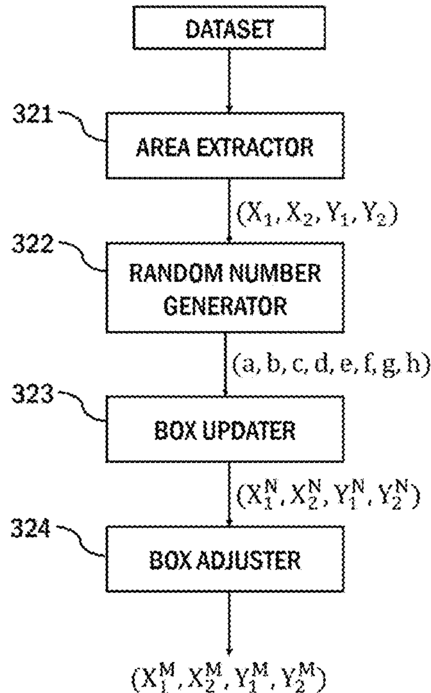
FIG. 4 is a view illustrating a structure of a detection area generator.

FIG. 4 is a detailed structure of the detection area generator 320. As shown in FIG. 4, the detection area generator 320 includes an area extractor 321, a random number generator 322, a box updater 323, and a box adjuster 324.

Figure 5:
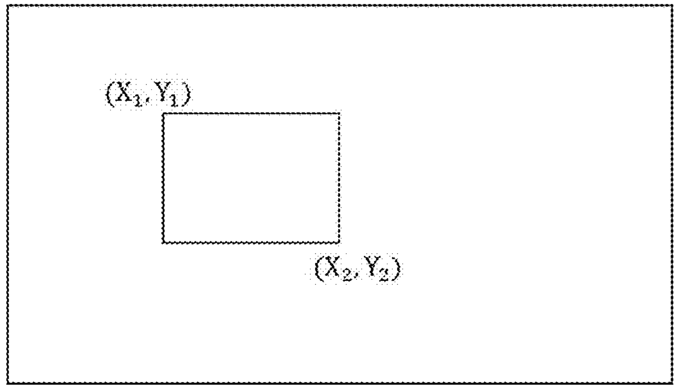
FIG. 5 is a view illustrating an example of a detection area box.
Figure 6:
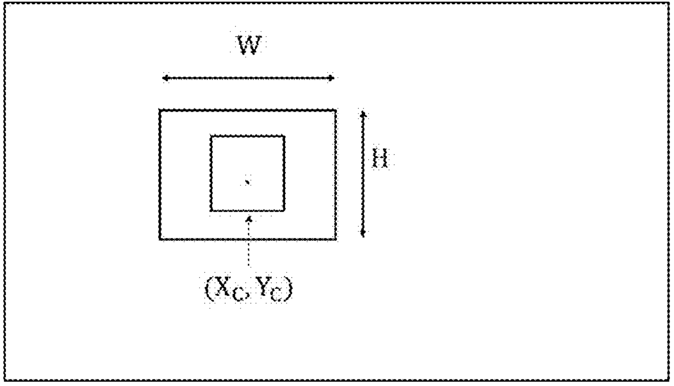
FIG. 6 is a view illustrating an example of a detection area box.
Figure 7:
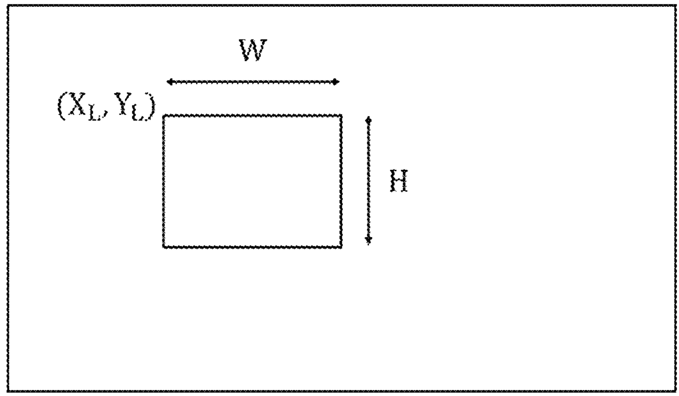
FIG. 7 is a view illustrating an example of a detection area box.

The area extractor 321 extracts coordinates of a face detection area from the training dataset configured by the training dataset configurator 310. Coordinates may be expressed by 4 points, and for example, may be expressed by the format of $(X_1, X_2, Y_1, Y_2)$ as shown in FIG. 5, the format of $(X_C, Y_C, W, H)$ as shown in FIG. 6, or the format of $(X_L, Y_L, W, H)$ as shown in FIG. 7. Coordinates are not limited to a specific format.

The random number generator 322 generates a random number to randomly generate coordinates every time training is performed. A random number generated by the random number generator 322 may be an integer number or a natural number. If a large random number is generated, coordinates may be generated out of an image. Therefore, a range in which random numbers are generated may be limited. The limited range may be a fixed value that is appropriately determined, and may be determined by considering an image size, a size of a detection area. For example, if $W=X_2-X_1$, $H=Y_2-Y_1$, a random number generation range may be determined based on the following equation 1, or may be limited to other ranges.

$$a, b, c, d = \frac{W}{2},\quad e, f, g, h = \frac{H}{2} \qquad \text{Equation 1}$$

Figure 8:
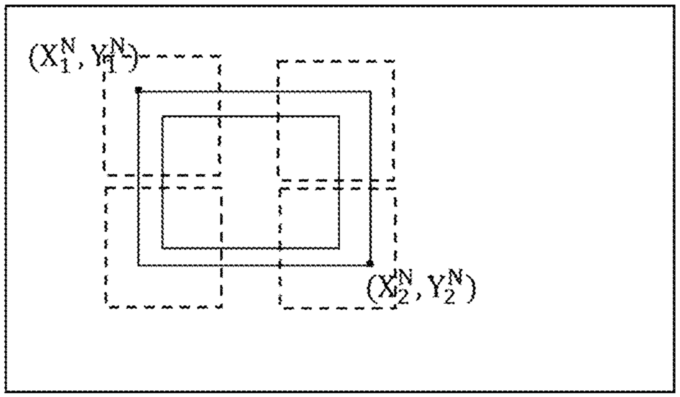
FIG. 8 is a view illustrating an example of a box updater.

The box updater 323 generates a new box by updating coordinates of a box (detection area) based on the random number generated by the random number generator 322. This operation may be expressed as shown in Equation 2 and is performed as shown in FIG. 8. In FIG. 8, a blue solid line box indicates an area that is constituted by $(X_1, X_2, Y_1, Y_2)$ extracted by the area extractor 321, and a dashed line box indicates a range that is changeable by adding or subtracting points existing at four vertexes by random numbers. In Equation 2, randint (m, n) is a function that outputs a certain integer between m and n.

$$\begin{aligned} X_1^N &= X_1 + randint(-a, b) \\ X_2^N &= X_2 + randint(-c, d) \\ Y_1^N &= Y_1 + randint(-e, f) \\ Y_2^N &= Y_2 + randint(-g, h) \end{aligned} \qquad \text{Equation 2}$$

Only coordinates of the top-left vertex $$(X_1^N, Y_1^N$$

of FIG. 8) of the box and the bottom-right vertex $$(X_2^N, Y_2^N$$

of FIG. 8) may be updated based on different random numbers.

The box adjuster 324 refines the value of $$(X_1^N, X_2^N, Y_1^N, Y_2^N)$$

calculated at the box updater 323 once more. Refining is performed for the purpose of 1) preventing a newly generated box from getting out of a range of an image, 2) preventing $$X_1^N$$

from being larger than $$X_2^N \text{ and } Y_1^N$$

from being larger than $$Y_2^N,$$

and 3) preventing a difference between $$X_1^N \text{ and } X_2^N$$

or a difference between $$Y_1^N \text{ and } Y_2^N$$

from being so small and a size of a box from being so small.

Figure 9:
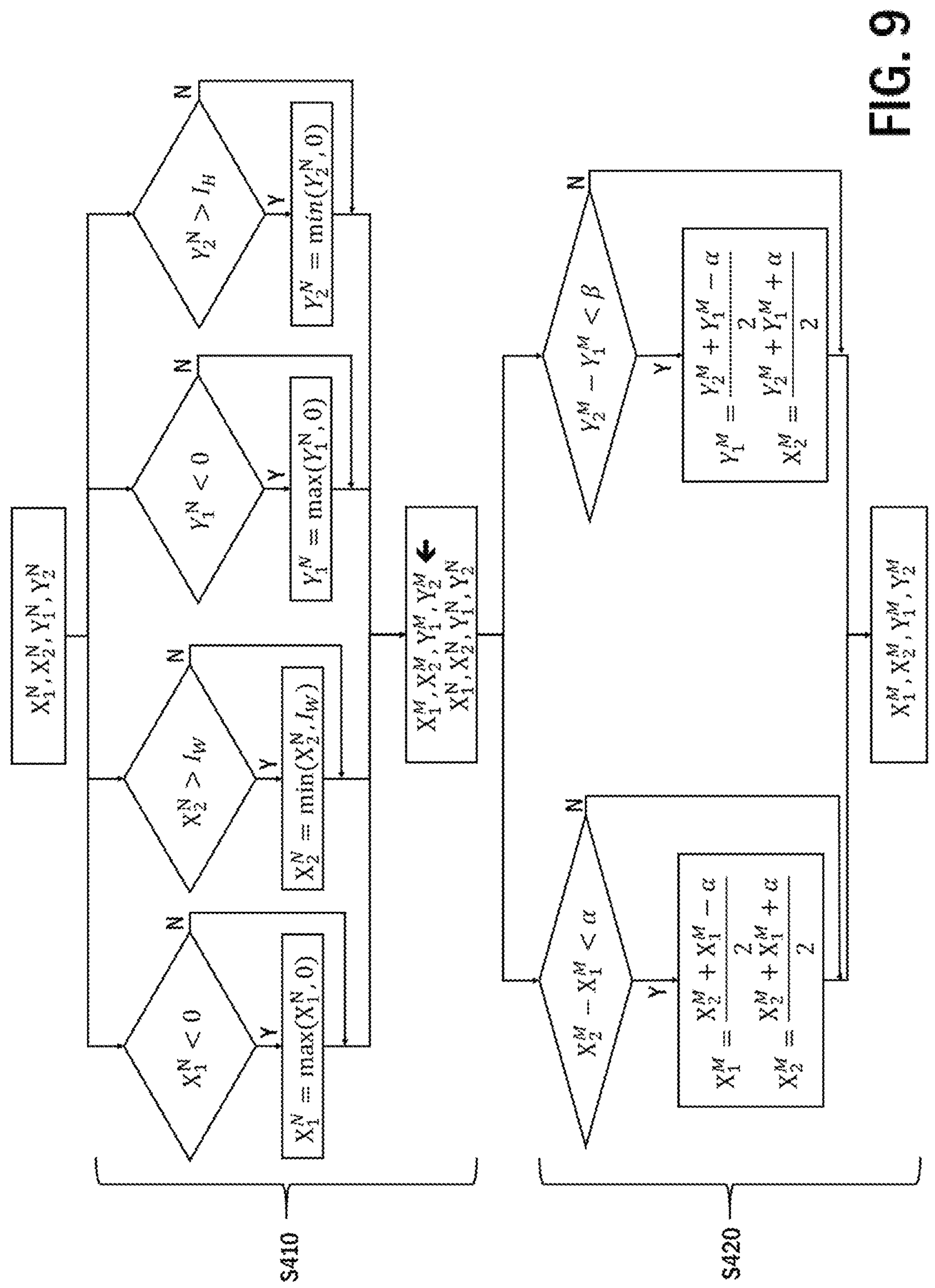
FIG. 9 is a view illustrating operations of a box adjuster.

A process to achieve this is illustrated in FIG. 9. Step S410 is a step of determining whether a box gets out of an image and adjusting an image to fall within the box when the box gest out of the image. Step S420 is a step of adjusting a size of a box to a minimum box size if the box size is smaller than a pre-set minimum box size, α, β. α, β may use a size of an image or a box size of ($X_1$, $X_2$, $Y_1$, $Y_2$). For example, it is set that $\alpha=(X_2-Y_1)/i$, $\beta=(Y_2-Y_1)/j$.

Updating and refining of the detection area may be applied to various formats such as the format of ($X_1$, $X_2$, $Y_1$, $Y_2$) of FIG. 5, the format of ($X_C$, $Y_C$, W, H) of FIG. 6, and the format of ($X_L$, $Y_L$, W, H) in a similar method.

According to embodiments of the disclosure, by augmenting a training dataset of the background area-associated face emotion recognizer 110, 120, 130, which analyzes a facial area and a background area detected from an image by the face detector 200 for detecting a facial area from an image, and recognizes emotions, through random transformation of a detection area, and by training the emotion recognizer 110, 120, 130, the emotion recognizer 110, 120, 130 is made to be resistant to performance degradation of the face detector 200.

Detection of a facial area described in the above-described embodiments is merely an example, and the technical concept of the disclosure may be applied to a case in which a detection result of a detector that detects a body rather than a face or detects other objects is used as an input.

In addition, a utilization domain is not limited to emotion recognition and may be extended to various applications such as behavior recognition, event recognition, object recognition.

The technical concept of the disclosure may be applied to a computer-readable recording medium which records a computer program for performing the functions of the apparatus and the method according to the present embodiments. In addition, the technical idea according to various embodiments of the disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the at without departing from the scope of the present disclosure claimed in claims, and also, changed embodiments should not be understood as being separate from the technical idea or prospect of the present disclosure.

What is claimed is:

1. A training dataset augmentation method comprising:

configuring a training dataset with image data from which a specific area is detected, and a label, wherein the specific area is detected by using a detector that is trained to detect a predefined area from an input image data; and adding a new training dataset by transforming the detected area in the configured training dataset, wherein the adding further comprises extracting coordinates of the detected area from the configured training dataset, generating a random number, and updating the coordinates of the detected area based on the generated random number, and wherein the updating comprises updating the coordinates for a top-left vertex of the detected area and a bottom-right vertex of the detected area based on different random numbers; and refining the updated coordinate in response to leftmost coordinates being determined to be larger than rightmost coordinates, or lowermost coordinates being determined to be larger than uppermost coordinates.

2. The training dataset augmentation method of claim 1, wherein the configuring comprises acquiring the image data and detecting the specific area from the image data by using the detector.

3. The training dataset augmentation method of claim 1, wherein the adding comprises randomly transforming the detected area.

4. The training dataset augmentation method of claim 3, further comprising training a deep learning model which performs inference from the image data from which the specific area is detected, by using the configured training dataset and the added training dataset.

5. The training dataset augmentation method of claim 1, wherein a generation range of the random number is limited based on an image size and a size of the detected area.

6. The training dataset augmentation method of claim 1, further comprising refining the updated coordinates.

7. The training dataset augmentation method of claim 6, wherein the refining is performed when the detected area transformed by the updated coordinates gets out of a range of the image, or when a size of the transformed detected area is less than a defined minimum size.

8. A training dataset augmentation system comprising:

one or more processors comprising:

a configurator configured to configure a training dataset with image data from which a specific area is detected, and a label, wherein the specific area is detected by using a detector that is trained to detect a predefined area from an input image data; and a generator configured to add a new training dataset by transforming the detected area in the configured training dataset, wherein, for the adding, the one or more processors are further configured to extract coordinates of the detected area from the configured training dataset, generate a random number, and update the coordinates of the detected area based on the generated random number, wherein, for the updating, the one or more processors are further configured to update the coordinates for a top-left vertex of the detected area and a bottom-right vertex of the detected area based on different random numbers, and wherein the one or more processors are further configured to refine the updated coordinate in response to leftmost coordinates being determined to be larger than rightmost coordinates, or lowermost coordinates being determined to be larger than uppermost coordinates.

9. A deep learning model training method comprising:

adding a new training dataset by transforming a detected area in a training dataset which is configured with image data from which a specific area is detected, and a label, wherein the specific area is detected by using a detector that is trained to detect a predefined area from an input image data; and training a deep learning model which performs inference from the image data from which the specific area is detected, by using the configured training dataset and the added training dataset, wherein the adding further comprises extracting coordinates of the detected area from the configured training dataset, generating a random number, and updating the coordinates of the detected area based on the generated random number, and wherein the updating comprises updating the coordinates for a top-left vertex of the detected area and a bottom-right vertex of the detected area based on different random numbers; and refining the updated coordinate in response to leftmost coordinates being determined to be larger than rightmost coordinates, or lowermost coordinates being determined to be larger than uppermost coordinates.

10. The system of claim 8, wherein, for the configuring, the one or more processors are configured to acquire the image data and detect the specific area from the image data by using the detector.

11. The system of claim 8, wherein, for the adding, the one or more processors are configured to randomly transform the detected area.

12. The system of claim 11, wherein the one or more processors are configured to train a deep learning model which performs inference from the image data from which the specific area is detected, by using the configured training dataset and the added training dataset.

13. The system of claim 8, wherein a generation range of the random number is limited based on an image size and a size of the detected area.

14. The system of claim 8, wherein the one or more processors are configured to refine the updated coordinates.

15. The system of claim 14, wherein the refining is performed when the detected area transformed by the updated coordinates gets out of a range of the image, or when a size of the transformed detected area is less than a defined minimum size.

* * * * *